(12) United States Patent
Kolb et al.

(10) Patent No.: US 12,522,772 B2
(45) Date of Patent: Jan. 13, 2026

(54) METHODS OF RECYCLING END-OF-LIFE RUBBER AND OIL-FOULED PLASTICS

(71) Applicant: ExxonMobil Chemical Patents Inc., Baytown, TX (US)

(72) Inventors: Rainer Kolb, Kingwood, TX (US); Brian W. Satterley, Humble, TX (US)

(73) Assignee: ExxonMobil Chemical Patents Inc., Baytown, TX (US)

( * ) Notice: Subject to any disclaimer, the term of this patent is extended or adjusted under 35 U.S.C. 154(b) by 207 days.

(21) Appl. No.: 18/512,204

(22) Filed: Nov. 17, 2023

(65) Prior Publication Data

US 2024/0182800 A1    Jun. 6, 2024

Related U.S. Application Data

(60) Provisional application No. 63/385,811, filed on Dec. 2, 2022.

(51) Int. Cl.
*C10G 55/04* (2006.01)
*C10B 53/07* (2006.01)

(52) U.S. Cl.
CPC ........... *C10G 55/04* (2013.01); *C10B 53/07* (2013.01); *C10G 2300/1003* (2013.01); *C10G 2300/4006* (2013.01)

(58) Field of Classification Search
CPC ........... C10G 55/04; C10G 2300/1003; C10G 2300/4006; C10G 1/10; C10B 53/07
USPC ...................................................... 585/241
See application file for complete search history.

(56) References Cited

U.S. PATENT DOCUMENTS

| | | | |
|---|---|---|---|
| 4,108,730 A | 8/1978 | Chen et al. | 201/2.5 |
| 4,118,281 A | 10/1978 | Yan | 201/2.5 |
| 4,851,601 A | 7/1989 | Fukuda et al. | 585/241 |
| 5,298,079 A | 3/1994 | Guymon | 134/16 |
| 11,421,159 B2 | 8/2022 | Pradeep et al. | C10G 1/10 |
| 2014/0364306 A1* | 12/2014 | Ozersky | C02F 1/286 502/402 |
| 2022/0372375 A1 | 11/2022 | Patel et al. | C10G 1/10 |
| 2023/0117658 A1* | 4/2023 | Bitting | C10G 1/10 208/14 |
| 2023/0139587 A1* | 5/2023 | DeBruin | C08J 11/12 252/373 |

FOREIGN PATENT DOCUMENTS

| | | | |
|---|---|---|---|
| WO | WO1995/014069 | 5/1995 | C10G 9/14 |
| WO | WO1997/008266 | 3/1997 | C10G 1/10 |

* cited by examiner

*Primary Examiner* — Prem C Singh
*Assistant Examiner* — Francis C Campanell

(57) ABSTRACT

Methods for absorbing residual hydrocarbon liquids from plastic waste including obtaining hydrocarbon liquid-fouled plastic waste shreds, wherein the plastic waste shreds have a particle size of about 0.1 inches to about 3 inches; admixing the hydrocarbon liquid-fouled plastic waste shreds with absorbent elastomer granules, wherein the absorbent elastomer granules have a particle size of about 0.05 inches to about 2 inches; wherein the ratio of absorbent elastomer to hydrocarbon liquid-fouled plastic is about 1:4 to about 4:1 by weight; and agitating the mixture for a period of time.

19 Claims, No Drawings

METHODS OF RECYCLING END-OF-LIFE RUBBER AND OIL-FOULED PLASTICS

CROSS REFERENCE TO RELATED APPLICATIONS

This application claims the benefit of and priority to U.S. Provisional Application No. 63/385,811 filed Dec. 2, 2022, the disclosure of which is incorporated herein by reference.

FIELD OF INVENTION

The present disclosure relates to the recycling of end-of-life rubber and plastics and, more particularly, the pre-treatment of oil-fouled plastics prior to recycling.

BACKGROUND

Oil-fouled plastic, such as that from motor lubricant or oil canisters, can be challenging to recycle, as the residual oil can plug filters and lubricate shredders, conveyors, extruders, and other recycling machinery. Current methods of removing the oil in washing and drying processes prior to mechanical recycling of the plastic waste are expensive, consume a large amount of water and energy, and generate a substantial amount of effluent requiring disposal or treatment. In chemical recycling processes, the oil can generally be processed along with the plastic waste but will cause the aforementioned problems during pre-processing steps, such as shredding, granulating, and conveying or transporting the plastic shreds.

SUMMARY

In one or more aspects, the present disclosure provides a method for absorbing residual hydrocarbon liquids from plastic waste comprising admixing the hydrocarbon liquid-fouled plastic waste shreds with granules of an absorbent elastomer, wherein the plastic waste shreds have a particle size of about 0.1 inches to about 3 inches, and wherein the absorbent elastomer granules have a particle size of about 0.05 inches to about 2 inches and the ratio of absorbent elastomer to hydrocarbon liquid-fouled plastic is about 1:4 to about 4:1 by weight, and agitating the mixture for a period of time.

In one or more aspects, the present disclosure provides a process for pyrolyzing a mixture of cleaned plastic waste and hydrocarbon liquid-absorbed elastomer granules in a coking unit comprising thermally cracking the mixture to at least partially convert the mixture components into their monomeric form, wherein the plastic waste is cleaned by a process comprising obtaining hydrocarbon liquid-fouled plastic waste shreds, wherein the plastic waste shreds have a particle size of about 0.1 inches to about 3 inches, admixing the hydrocarbon liquid-fouled plastic waste shreds with absorbent elastomer granules, wherein the absorbent elastomer granules have a particle size of about 0.05 inches to about 2 inches and the ratio of absorbent elastomer to hydrocarbon liquid-fouled plastic is about 1:4 to about 4:1 by weight, and agitating the mixture for a period of time.

These and other features and attributes of the disclosed methods of the present disclosure and their advantageous applications and/or uses will be apparent from the detailed description which follows.

DETAILED DESCRIPTION

The present disclosure relates to the recycling of end-of-life rubber and plastics and, more particularly, the pre-treatment of oil-fouled plastics prior to recycling. In various aspects, methods are provided for absorbing hydrocarbon liquids from plastic waste by mixing hydrocarbon liquid-fouled plastics with absorbent elastomer granules and agitating the mixture. After adequate hydrocarbon absorption by the elastomer granules, the cleaned plastic waste and elastomer mixture can then be chemically recycled, or the elastomer can be separated from the mixture so that the plastic can be mechanically recycled.

In various aspects, systems and methods are provided for co-processing plastic waste and elastomer granules in a coker as part of an integrated refinery environment. The co-processing can be performed in a fluidized coker, a delayed coker, or a combination of fluidized cokers and delayed cokers. After coking, hydroprocessing can be performed on one or more portions of the coker effluent.

Plastic waste generally corresponds to a mixture of multiple types of polymers. As a result, to the degree that coking of such polymers forms liquid phase products, such liquid phase products also typically correspond to hydrocarbons.

Coking can provide a flexible reaction system for co-processing of plastic waste and elastomers. Even though the type of polymers in plastic waste can vary widely, coking can be performed to generate a liquid product slate. In aspects where FLEXICOKING™ is used for coking, synthesis gas can also be generated while reducing or minimizing net coke yield when co-processing a conventional coker feed with plastic waste.

In some aspects, co-processing of plastic waste in a coking environment can provide advantages relative to coking of a conventional feed. Conventional coker feeds are often selected for coking based on having a relatively low molar ratio of hydrogen atoms to carbon atoms in the feed. In comparison with such a conventional coker feed, many types of plastic waste include a higher molar ratio of hydrogen atoms to carbon atoms. This additional hydrogen content in plastic waste can reduce the amount of coke that is formed in favor of increased production of liquid products.

In some aspects, a plastic waste and elastomer feedstock can be co-processed with a coker feedstock in a fluidized coking environment, such as a FLEXICOKING™ environment. By sufficiently reducing or minimizing the particle size of the particles in a plastic waste and elastomer feedstock, the plastic waste can be unexpectedly incorporated into a fluidized coking environment. Further additional benefits can be realized in a FLEXICOKING™ environment, where plastic waste and elastomer granules can be co-processed while increasing the amount of production of synthesis gas.

Definitions

All numerical values within the detailed description and the claims herein are modified by "about" or "approximately" the indicated value, and take into account experimental error and variations that would be expected by a person having ordinary skill in the art.

In this discussion, a reference to a "$C_x$" fraction, stream, portion, feed, or other quantity is defined as a fraction (or other quantity) where 50 wt % or more of the fraction corresponds to hydrocarbons having "x" number of carbons. When a range is specified, such as "$C_x$-$C_y$," 50% by weight (wt %) or more of the fraction corresponds to hydrocarbons having a number of carbons between "x" and "y." A specification of "$C_{x+}$" (or "$C_{x-}$") corresponds to a fraction where 50 wt % or more of the fraction corresponds to hydrocarbons having the specified number of carbons or more (or the specified number of carbons or less).

In this discussion, a liquid product/liquid portion is defined as a product/portion that is in the liquid state at 25° C. and 100 kPa-a. A gas or vapor product/gas or vapor portion is defined as a product/portion that is in the gas phase at 25° C. and 100 kPa-a. It is noted that at some points during processing, a liquid product/portion may be present in a gaseous phase due to an increased temperature (and/or the combination of temperature and pressure) within a reaction system. Similarly, depending on the nature of the full configuration used, a vapor product/portion may be in a liquid phase due to the combination of temperature and pressure at a location within the reaction system.

Unless otherwise specified, weights of polymers in a feedstock correspond to weights relative to the total polymer content in the feedstock. Any additives and/or modifiers and/or other components included in a formulated polymer are included in this weight. However, the weight percentages described herein exclude any solvents or carriers that might optionally be used to facilitate transport of the polymer into the initial pyrolysis stage.

The term "FLEXICOKING™" (trademark of ExxonMobil) is used to designate a fluid coking process in which heavy petroleum feeds are subjected to thermal cracking in a fluidized bed of heated solid particles to produce hydrocarbons of lower molecular weight and boiling point, along with coke as a by-product which is deposited on the solid particles in the fluidized bed. The resulting coke can then be converted to a fuel gas by contact at elevated temperature with steam and an oxygen-containing gas in a gasification reactor (gasifier). This type of configuration can more generally be referred to as an integration of fluidized bed coking with gasification.

As used herein, the terms "hydrocarbon liquid" and "liquid hydrocarbon" are used interchangeably and both refer to hydrocarbons that are in the liquid state at ambient conditions.

As used herein, the term "plastic waste" refers to a plastic, as described herein, that is fouled with hydrocarbon liquids.

As used herein, the term "absorbent elastomer" refers to rubber, as described herein, that is used to absorb (clean) at least a portion of hydrocarbon liquids from plastic waste.

The term "cleaned plastic waste" refers to plastic waste that has been processed with an absorbent elastomer to remove at least a portion of hydrocarbon liquids therefrom.

Absorption of Hydrocarbon Liquids from Plastic Waste

To ensure adequate hydrocarbon absorption, plastic waste pieces and elastomer granules must be small enough so that there is sufficient interaction between the two materials. Furthermore, the plastic waste shreds (which may be interchangeably used with the term "pieces") may have a particle size of about 0.1 inches to about 3 inches (or about 0.1 inches to about 1 inch, or about 0.25 inches to 1.25 inches, or about 0.5 inches to about 1.5 inches, or about 1 inch to about 3 inches) and the absorbent elastomer granules may have a particle size of about 0.05 inches to about 2 inches (or about 0.05 inches to about 1 inch, or about 0.5 inches to about 1.5 inches, or about 1 inch to about 2 inches). The ratio of absorbent elastomer to the fouled plastic waste may be about 1:4 to about 4:1 by weight (or about 1:2 to about 2:1, or about 1:3 to about 3:1), ideally about 1:1 by weight.

In one aspect, the hydrocarbon liquid that is to be absorbed by the elastomer granules is present in an amount of at least about 1 wt % to about 20 wt % (or about 1 wt % to about 10 wt %, or about 5 wt % to about 15 wt %, or about 10 wt % to about 20 wt %), based on the total weight of the mixture of hydrocarbon liquid-fouled plastic and absorbent elastomer granules.

In another aspect, the plastic waste may be comprised of a single polyolefin or a plurality of polyolefins. Suitable polyolefins may include, but are not limited to, high-density polyethylene, low-density polyethylene, linear low-density polyethylene, polypropylene, and the like, and any combination thereof. Other plastic waste may include, but is not limited to, rigid engineering plastics, such as, polystyrene, polyethylene terephthalate, polybutylene terephthalate, nylon, polyvinyl acetate, polyamides, polycarbonates, polyetherketones, and the like, and any combination thereof; or high performance plastics, such as polyphenylene sulfide, polysulfones, and the like, and any combination thereof. The plastic waste may be sourced from materials such as automotive, aviation, or boat or marine components, motor oil or lubricant containers, plastic food containers or components thereof, plastic tanks that hold liquid hydrocarbons, engineering materials, or any combinations of these.

It can be appreciated by one in the art that other hydrocarbon liquid-fouled substances and surfaces, including, but not limited to, metals, sand, water, cement/concrete, and the like, and any combination thereof may be suitable for use in combination with, or instead of plastic waste.

In general, the absorbent elastomer may include, but is not limited to, a thermoset rubber, a thermoplastic elastomer, a thermoplastic vulcanizate, other plastomer materials, or any combination thereof. Specific thermoset rubbers include, but are not limited to, styrene-butadiene rubber (SBR), ethylene propylene rubber (EPR), ethylene propylene diene methylene rubber (EPDM), butyl rubber, polybutadiene rubber, natural rubber, and any combination thereof.

In some instances, the absorbent elastomer may be sourced from materials such as post-consumer waste tires, rubber powder from tire retreading operation artificial turf, coolant hoses, power transmission belts, conveyor belts, weather seals, running tracks, rubber mats, rubber mulch, crumb rubber, roof sheets, or other like materials and combinations thereof.

To facilitate sufficient contact between the hydrocarbon liquid-fouled plastic shreds and the absorbent elastomer granules, the mixture may be agitated for some period of time in a tumbler or other agitator device. In some aspects, the total amount of time the mixture is agitated may be from about five minutes to about 24 hours, such as for about eight hours. The time will depend on a number of factors, such as contact efficiency related to the size of the absorbent elastomers and agitation speed, for example. The temperature at which agitation occurs may be from about 0° C. to about 100° C. such as about 10° C. to about 60° C. or about 20° C. to about 40° C. encompassing any value and subset therebetween. In one or more aspects, the temperature at which agitation occurs may be room temperature (i.e., at about 20° C. to 25° C.). Without being bound by theory, elevated temperatures may assist with decreasing the agitation time required to remove the hydrocarbon liquids from the plastic waste.

In another aspect, the hydrocarbon liquid coating the plastic waste may be from an oil or lubricating fluid, such as motor oil, lubricant, brake fluid, transmission fluid, mineral oil, diesel oil, kerosene, gasoline, marine fuel, residual fuel in gas tanks, or any combination of these.

Chemical Recycling of Cleaned Plastic Waste/Elastomer Mixture

The processing of cleaned plastic waste may result in the production or recovery of olefins, or the attribution of waste feedstock to olefins, including any of the alpha-olefins disclosed herein, used in making the polymer compositions disclosed herein.

The cleaned waste that is recycled may also include any of various used polymeric and non-polymeric articles without limitation. Some examples of the many types of polymeric articles may include, but are not limited to, films (including cast, blown, and otherwise), sheets, fibers, woven and nonwoven fabrics, furniture (e.g., garden furniture), sporting equipment, bottles, food and/or liquid storage containers, transparent and semi-transparent articles, toys, tubing and pipes, sheets, packaging, bags, sacks, coatings, caps, closures, crates, pallets, cups, non-food containers, pails, insulation, and/or medical devices. Further examples include automotive, aviation, boat and/or watercraft components (e.g., bumpers, grills, trim parts, dashboards, instrument panels and the like), wire and cable jacketing, agricultural films, geomembranes, playground equipment, and other such articles, whether blow molded, roto-molded, injection-molded, or the like. Any of the foregoing may include mixtures of polymeric and non-polymeric items (e.g., packaging or other articles may include inks, paperboards, papers, metal deposition layers, and the like). The ordinarily skilled artisan will appreciate that such polymeric articles may be made from any of various polymer and/or non-polymer materials, and that the polymer materials may vary widely (e.g., ethylene-based, propylene-based, butyl-based polymers, and/or polymers based on any $C_2$ to $C_{40}$ or even higher olefins, and further including polymers based on any one or more types of monomers, e.g., $C_2$ to $C_{40}$ α-olefin, di-olefin, cyclic olefin, etc. monomers). Common examples include, but are not limited to, ethylene, propylene, butylene, pentene, hexene, heptene, octene, and any combination thereof; as well as multi-olefinic (including cyclic olefin) monomers such as ethylidene norbornene (ENB) and vinylidene norbornene (VNB) (including, e.g., when such cyclic olefins are used as comonomers, e.g., with ethylene monomers), and any combination thereof.

Processing of plastic waste (plastic waste as defined herein that is suitable for use in a coker without creating an unwanted byproduct), such as through the pyrolysis of plastic waste, may directly produce or recover olefins used to make such polymer compositions or via the attribution of the use of the waste as a feed to a system, such as determined by crediting, allocating, and/or offsetting or substituting for other hydrocarbons in a mass or energy balance for a system, such as in accordance with a third party certification relating to circularity. Polymers that are certified for their circularity by third party certification may be referred to as "certified circular." One example of such a certification is the mass balance chain of custody method set forth by the International Sustainability and Carbon Certification.

Various processes may be employed to produce, recover, or attribute to olefins used for the polymers disclosed herein. For example, olefins may be obtained from or in connection with the co-processing of waste, such as plastic waste, with other hydrocarbon feeds in a cracking, coking, hydroprocessing, and/or pyrolysis processes. For example, the olefins may be obtained directly or indirectly from fluid catalytic cracking units, delayed coking units, fluidized coking units (including FLEXICOKING™ units), hydroprocessing units (including hydrocracking and hydrotreating units), and/or steam cracking units (including gas or liquid steam cracking units) receiving such waste as a feed or co-feed. Alternatively, such units may receive a pyrolysis product from the processing of such waste (such as a separated or combined recycled pyrolysis gas and/or recycled pyrolysis oil) as a feed or co-feed. The olefins may be directly produced by such process or may be obtained by further processing, such as separation, treating, and/or cracking of an effluent of such processes. As an example, the olefins may be obtained by the processing of recycle pyrolysis oil and/or recycle pyrolysis gas produced from the pyrolysis of plastic waste. As used herein "recycle pyrolysis oil" refers to compositions of matter that are liquid when measured at 25° C. and 1 atmosphere (atm), and at least a portion of which are obtained from the pyrolysis of recycled waste (e.g., recycled plastic waste). As used herein "recycle pyrolysis gas" refers to compositions of matter that are a gas at 25° C. and 1 atm, and at least a portion of which are obtained from the pyrolysis of recycled waste. In addition, co-processing of cleaned plastic waste, as a feed or co-feed into fluid catalytic cracking units, delayed coking units, fluidized coking units (including FLEXICOKING™ units), hydroprocessing units (including hydrocracking and hydrotreating units), and/or steam cracking units (including gas or liquid steam cracking units) may result in the attribution of the waste to olefins, polymers, or polymer compositions described herein, such as determined by crediting, allocating, and/or offsetting or substituting for other hydrocarbons in a mass or energy balance for a system, such as in accordance with a third party certification relating to circularity.

Accordingly, processes per various embodiments herein may further include obtaining olefins that have been produced or recovered from the processing of plastic waste or olefins to which the processing of plastic waste has been attributed, e.g., for employment in polymerization processes as elsewhere described herein; and polymer compositions of various embodiments described herein may comprise olefins that have been produced or recovered from the processing of plastic waste or olefins to which the processing of plastic waste has been attributed. As an example, at least a portion of the olefin content (e.g., employed in processes and/or included in compositions as described herein) may be from olefins that are produced or recovered directly from the processing of plastic waste. Similarly, the processing of plastic waste may be attributed to at least a portion the olefins (e.g., employed in processes and/or included in compositions as described herein).

In accordance with one or more aspects of the present disclosure, a plastic feedstock for co-processing includes or consist essentially of one or more types of cleaned plastic waste. The systems and methods described herein can be suitable for processing cleaned plastic waste.

A plastic feedstock can be combined with one or more additional feedstocks to form a combined feed for co-processing in a coking environment. The plastic feedstock or combined feedstock may be transported using a pneumatic feeder. In various aspects, the cleaned plastic waste feedstock can correspond to about 0.1 wt % to about 30 wt % of the combined feed for coking (relative to a weight of the combined feed), or 0.1 wt % to 20 wt %, or 0.1 wt % to 10 wt %, or 0.1 wt % to 5.0 wt %, or 1.0 wt % to 30 wt %, or 1.0 wt % to 20 wt %, or 1.0 wt % to 10 wt %, or 1.0 wt % to 5.0 wt %, or 5.0 wt % to 30 wt %, or 5.0 wt % to 20 wt %. In some aspects, 50 wt % or more of the combined feed can correspond to feedstock with a boiling point of 343° C. or higher.

In another aspect, the plastic feedstock or combined feedstock may be transported using a pneumatic feeder.

In some aspects, the coker feedstock for co-processing with the plastic waste feedstock can correspond to a relatively high boiling fraction, such as a heavy oil feed. For example, the coker feedstock portion of the feed can have a T10 distillation point of 343° C. or more, or 371° C. or more. Examples of suitable heavy oils for inclusion in the coker feedstock include, but are not limited to, reduced petroleum crude; petroleum atmospheric distillation bottoms; petroleum vacuum distillation bottoms, or residuum; pitch; asphalt; bitumen; other heavy hydrocarbon residues; tar sand oil; shale oil; or a coal slurry or coal liquefaction product such as coal liquefaction bottoms; and any combination thereof. Such feeds will typically have a Conradson Carbon Residue (ASTM D189-165) of at least about 5 wt %, generally from about 5 to about 50 wt %. In some preferred aspects, the feed is a petroleum vacuum residuum.

Coking processes in modern refinery settings can typically be categorized as delayed coking or fluidized bed coking. Fluidized bed coking is a petroleum refining process in which heavy petroleum feeds, typically the non-distillable residues (resids) from the fractionation of heavy oils are converted to lighter, more useful products by thermal decomposition (coking) at elevated reaction temperatures, typically about 480° C. to about 590° C. (~900° F. to 1100° F.) and in most cases from about 500° C. to about 550° C. (~930° F. to 1020° F.). Heavy oils which may be processed by the fluid coking process include heavy atmospheric resids, petroleum vacuum distillation bottoms, aromatic extracts, asphalts, and bitumens from tar sands, tar pits, and pitch lakes of Canada (Athabasca. Alta.), Trinidad, Southern California (La Brea (Los Angeles)), McKittrick (Bakersfield. Calif.), Carpinteria (Santa Barbara County, Calif.), Lake Bermudez (Venezuela) and similar deposits such as those found in Texas. Peru. Iran, Russia, and Poland. Such feeds can be co-processed with biomass oil. The biomass oil and conventional feed can be introduced separately, or the biomass oil and conventional feed can be mixed prior to introduction into the coking environment. The biomass oil and/or conventional feed can be introduced into the coking environment in a conventional manner.

The FLEXICOKING™ process, developed by Exxon Research and Engineering Company, is a variant of the fluid coking process that is operated in a unit including a reactor and a heater, but also including a gasifier for gasifying the coke product by reaction with an air/steam mixture to form a low heating value fuel gas. A stream of coke passes from the heater to the gasifier where all but a small fraction of the coke is gasified to a low-BTU gas (~120 BTU/standard cubic feet) by the addition of steam and air in a fluidized bed in an oxygen-deficient environment to form fuel gas comprising carbon monoxide and hydrogen. In a conventional FLEXICOKING™ configuration, the fuel gas product from the gasifier, containing entrained coke particles, is returned to the heater to provide most of the heat required for thermal cracking in the reactor with the balance of the reactor heat requirement supplied by combustion in the heater. A small amount of net coke (about 1 percent of feed) is withdrawn from the heater to purge the system of metals and ash. The liquid yield and properties are comparable to those from fluid coking. The fuel gas product is withdrawn from the heater following separation in internal cyclones which return coke particles through their diplegs.

Unless otherwise indicated, all numbers expressing quantities of ingredients, properties such as molecular weight, reaction conditions, and so forth used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by the incarnations of the present inventions. At the very least, and not as an attempt to limit the application of the doctrine of equivalents to the scope of the claim, each numerical parameter should at least be construed in light of the number of reported significant digits and by applying ordinary rounding techniques.

One or more illustrative incarnations incorporating one or more invention elements are presented herein. Not all features of a physical implementation are described or shown in this application for the sake of clarity. It is understood that in the development of a physical embodiment incorporating one or more elements of the present invention, numerous implementation-specific decisions must be made to achieve the developer's goals, such as compliance with system-related, business-related, government-related and other constraints, which vary by implementation and from time to time. While a developer's efforts might be time-consuming, such efforts would be, nevertheless, a routine undertaking for those of ordinary skill in the art and having benefit of this disclosure.

While compositions and methods are described herein in terms of "comprising" various components or steps, the compositions and methods can also "consist essentially of" or "consist of" the various components and steps.

ADDITIONAL EMBODIMENTS

Embodiments Herein Include:

Embodiment 1. A method for absorbing residual hydrocarbon liquids from plastic waste comprising obtaining hydrocarbon liquid-fouled plastic waste shreds, wherein the plastic waste shreds have a particle size of about 0.1 inches to about 3 inches, admixing the hydrocarbon liquid-fouled plastic waste shreds with absorbent elastomer granules, wherein the absorbent elastomer granules have a particle size of about 0.05 inches to about 2 inches and the ratio of absorbent elastomer to hydrocarbon liquid-fouled plastic is about 1:4 to about 4:1 by weight, and agitating the mixture for a period of time.

Embodiment 2. A method according to Embodiment 1, wherein the hydrocarbon liquid is present in an amount of about 1 wt % to about 20 wt %, based on the total weight of the mixture.

Embodiment 3. A method according to either of Embodiments 1 or 2, wherein the plastic waste comprises polyolefins, rigid plastics, engineering plastics, or any combination thereof.

Embodiment 4. A method according to any of Embodiments 1-3, wherein the polyolefins comprise high-density polyethylene, low-density polyethylene, linear low-density polyethylene, polystyrene, polypropylene, or combinations thereof.

Embodiment 5. A method according to any of Embodiments 1-4, wherein the hydrocarbon liquid-fouled plastic waste shreds are sourced from automotive components, aviation components, boat components, marine components, motor oil containers, lubricant containers, plastic food containers, plastic tanks that hold liquid hydrocarbons, engineering materials, or any combinations of these.

Embodiment 6. A method according to any of Embodiments 1-5, wherein the ratio of absorbent elastomer to hydrocarbon liquid-fouled plastic waste is about 1:1 by weight.

Embodiment 7. A method according to any of Embodiments 1-6, wherein the absorbent elastomer comprises thermoset rubber, thermoplastic elastomers, thermoplastic vulcanizates, thermoplastic materials, or any combination thereof.

Embodiment 8. A method according to Embodiment 7, wherein the thermoset rubber is comprised of styrene-butadiene rubber, ethylene propylene rubber, ethylene propylene diene methylene rubber, butyl rubber, polybutadiene rubber, natural rubber, or combinations thereof.

Embodiment 9. A method according to Embodiment 8, wherein the thermoset rubber is sourced from post-consumer waste tires, artificial turf, coolant hoses, power transmission belts, conveyor belts, weather seals, running tracks, rubber mats, rubber mulch, crumb rubber, roof sheets, or combinations thereof.

Embodiment 10. A method according to any of Embodiments 1-9, wherein the time for agitating the mixture is from about 5 minutes to about 24 hours.

Embodiment 11. A method according to any of Embodiments 1-10, wherein the hydrocarbon liquid is comprised of motor oil, lubricant, brake fluid, transmission fluid, mineral oil, diesel oil, kerosene, gasoline, marine fuel, residual fuel in gas tanks, or combinations thereof.

Embodiment 12. A method according to any of Embodiments 1-11, wherein about 40% or more of the hydrocarbon liquid, based on the total initial weight of the hydrocarbon liquid, is absorbed by the elastomer.

Embodiment 13. A process for pyrolyzing a mixture of cleaned plastic waste and hydrocarbon liquid-absorbed elastomer granules in a coking unit comprising thermally cracking the mixture to at least partially convert the mixture components into their monomeric form, wherein the plastic waste is cleaned by a process comprising obtaining hydrocarbon liquid-fouled plastic waste shreds, wherein the plastic waste shreds have a particle size of about 0.1 inches to about 3 inches, admixing the hydrocarbon liquid-fouled plastic waste shreds with absorbent elastomer granules, wherein the absorbent elastomer granules have a particle size of about 0.05 inches to about 2 inches and the ratio of absorbent elastomer to hydrocarbon liquid-fouled plastic is about 1:4 to about 4:1 by weight, and agitating the mixture for a period of time.

Embodiment 14. A process according to Embodiment 13, wherein the thermal cracking occurs at a temperature of about 480° C. to about 590° C.

Embodiment 15. A process according to either of Embodiments 13 or 14, wherein the cleaned plastic waste and hydrocarbon liquid-absorbed elastomer granules feedstock can be combined with one or more additional feedstocks to form a combined feed for co-processing in a coking environment.

Embodiment 16. A process according to Embodiment 15, wherein the cleaned plastic waste and hydrocarbon liquid-absorbed elastomer granules feedstock can correspond to about 0.1 wt % to about 30 wt %.

Embodiment 17. A process according to Embodiment 15, wherein the hydrocarbon liquid is present in an amount of about 1 wt % to about 20 wt %, based on the total weight of the hydrocarbon liquid-fouled plastic waste shreds and the absorbent elastomer granules.

Embodiment 18. A process according to Embodiment 15, wherein the combined feed is co-processed in a fluidized coking environment.

Embodiment 19. A process according to Embodiment 15, wherein the plastic waste comprises polyolefins.

Embodiment 20. A process according to Embodiment 19, wherein the polyolefins comprise high-density polyethylene, low-density polyethylene, linear low-density polyethylene, polystyrene, polypropylene, or combinations thereof.

To facilitate a better understanding of the embodiments of the present invention, the following examples of preferred or representative embodiments are given. In no way should the following examples be read to limit, or to define, the scope of the invention.

EXAMPLES

Example 1: Residual Oil Content of Plastic Waste

Empty high-density polyethylene (HDPE) bottles that had previously contained lubricating oil for automobile engines were shredded to an average size of approximately 0.5 inches. Clean HDPE shreds (i.e., HDPE shreds that had not been contaminated with lubricating oil) were used as a control. The shreds (~100 g or ~50 g) were washed with 500 mL of either heptane or ISOPAR™ L (ExxonMobil) by stirring the mixture of HPDE shreds and solvent for 1 hour at room temperature. When washed with ISOPAR™ L, the HPDE shreds were rinsed with an additional 500 mL of heptane following the ISOPAR™ L wash. After the washing steps, the solvent-lubricating oil solution was filtered (strained) from the plastic shreds and the oil phase was separated from the solution. The HDPE shreds were dried overnight and the mass of the clean HDPE shreds was compared to the mass of oil collected. Table 1 shows the average results of these experiments given two replicates per tested solvent. The discrepancy in the weight of the control HDPE may be due to mechanical sloughing of the plastic during the washing step. The discrepancy in weight and collected mass of oil-fouled HDPE with heptane as a solvent is believed to be due to filtration losses due to residual material remaining in the filter, which may have adhesives and small foreign objects due to their oil-found nature.

TABLE 1

| Sample | Solvent | Initial weight of plastic (g) | Final weight of plastic (g) | Mass of oil collected (g) |
|---|---|---|---|---|
| Oil-fouled HDPE | Heptane | 100.62 | 87.76 | 11.74 |
| Oil-fouled HDPE | ISOPAR ™ L | 99.99 | 87.00 | — |
| Control HDPE | Heptane | 50.47 | 50.25 | — |

Example 2: Rubber Absorption of Oil

The following example demonstrates the ability of highly cross-linked rubber from end-of-life tires to absorb oil.

End-of-life highly crosslinked tire shreds (3.56 g) were loaded onto the frit of a fritted filter with the bottom outlet temporarily sealed and fit to a vacuum flask. MOBIL 1™ 10W-30 motor oil (80 mL) was subsequently loaded onto the frit with the tire shreds. After 22 hours of contact at room temperature, the fritted filter's outlet was unsealed and the mixture was vacuumed for two hours to remove any unabsorbed oil. While under vacuum, the tire shreds were washed twice with acetone, then removed from the frit. After placing the tire shreds on an analytical balance, residual acetone was allowed to evaporate at ambient temperature and pressure until the mass of the shreds was stable to the ten thousandth place. The final mass of the tire shreds was 4.47 g.

The percent of oil absorption by the tire shreds was calculated by dividing the difference between the final and initial weight of the tire shreds by the shreds' initial weight and multiplying by 100. The tire shreds were determined to have absorbed 25.5% of the motor oil.

Example 3: Rubber Absorption of Oil from Plastic Shreds

Plastic shreds contaminated with oil (19.91 g) were rinsed with 150 mL of heptane and allowed to dry under vacuum filtration for six hours at room temperature. The cleaned plastic shreds (17.23 g) were added to a jar with 1.05 g of MOBIL 1™ 10W-30 motor oil and 20.94 g of rubber tire shreds. The jar was tumbled for 24 hours at room temperature and 25 rpm. After removing the contents from the jar, the rubber-plastic-motor oil mixture was rinsed with acetone and allowed to dry under vacuum filtration for six hours at room temperature. The final mass of the mixture was 38.69 g.

The efficiency of oil absorption by the rubber shreds was calculated by the following equation.

$$\text{absorption efficiency} = 1 - \left(\frac{\begin{array}{c}(\text{initial mass of motor oil+plastic+rubber}) - \\ (\text{final mass of mixture after oil absorption})\end{array}}{\text{initial mass of motor oil}}\right) \times 100\% \quad \text{Equation 1}$$

The efficiency of oil absorption from plastic by the rubber shreds was 49.5%. The efficiency may depend upon, among other things, the efficiency of contact (surface area), temperature, time, and method of removal (agitation or pyrolysis) and it is contemplated that the efficiency of oil absorption from plastic by the rubber shreds may be up to 100%.

Therefore, the present invention is well adapted to attain the ends and advantages mentioned as well as those that are inherent therein. The particular examples and configurations disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative examples disclosed above may be altered, combined, or modified and all such variations are considered within the scope and spirit of the present invention. The invention illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an." as used in the claims, are defined herein to mean one or more than one of the element that it introduces.

The invention claimed is:

1. A method for absorbing residual hydrocarbon liquids from plastic waste comprising:
   obtaining hydrocarbon liquid-fouled plastic waste shreds, wherein the plastic waste shreds have a particle size of about 0.1 inches to about 3 inches;
   admixing the hydrocarbon liquid-fouled plastic waste shreds with absorbent elastomer granules, wherein the absorbent elastomer granules have a particle size of about 0.05 inches to about 2 inches;
   wherein the ratio of absorbent elastomer to hydrocarbon liquid-fouled plastic is about 1:4 to about 4:1 by weight; and
   agitating the mixture for a period of time.

2. The method of claim 1, wherein the hydrocarbon liquid is present in an amount of about 1 wt % to about 20 wt %, based on the total weight of the mixture.

3. The method of claim 1, wherein the plastic waste comprises polyolefins, rigid plastics, engineering plastics, or any combination thereof.

4. The method of claim 3, wherein the polyolefins comprise high-density polyethylene, low-density polyethylene, linear low-density polyethylene, polystyrene, polypropylene, or combinations thereof.

5. The method of claim 1, wherein the hydrocarbon liquid-fouled plastic waste shreds are sourced from automotive components, aviation components, boat components, marine components, motor oil containers, lubricant containers, plastic food containers, plastic tanks that hold liquid hydrocarbons, engineering materials, or any combinations of these.

6. The method of claim 1, wherein the ratio of absorbent elastomer to hydrocarbon liquid-fouled plastic waste is about 1:1 by weight.

7. The method of claim 1, wherein the absorbent elastomer comprises thermoset rubber, thermoplastic elastomers, thermoplastic vulcanizates, thermoplastic materials, or any combination thereof.

8. The method of claim 7, wherein the thermoset rubber is comprised of styrene-butadiene rubber, ethylene propylene rubber, ethylene propylene diene methylene rubber, butyl rubber, polybutadiene rubber, natural rubber, or combinations thereof.

9. The method of claim 8, wherein the thermoset rubber is sourced from post-consumer waste tires, artificial turf, coolant hoses, power transmission belts, conveyor belts, weather seals, running tracks, rubber mats, rubber mulch, crumb rubber, roof sheets, or combinations thereof.

10. The method of claim 1, wherein the time for agitating the mixture is from about 5 minutes to about 24 hours.

11. The method of claim 1, wherein the hydrocarbon liquid is comprised of motor oil, lubricant, brake fluid, transmission fluid, mineral oil, diesel oil, kerosene, gasoline, marine fuel, residual fuel in gas tanks, or combinations thereof.

12. The method of claim 1, wherein about 40% or more of the hydrocarbon liquid, based on the total initial weight of the hydrocarbon liquid, is absorbed by the elastomer.

13. A process for pyrolyzing a mixture of cleaned plastic waste and hydrocarbon liquid-absorbed elastomer granules in a coking unit comprising:
   thermally cracking the mixture to at least partially convert the mixture components into their monomeric form;
   wherein the plastic waste is cleaned by a process comprising:
      obtaining hydrocarbon liquid-fouled plastic waste shreds, wherein the plastic waste shreds have a particle size of about 0.1 inches to about 1.5 inches;
      admixing the hydrocarbon liquid-fouled plastic waste shreds with absorbent elastomer granules, wherein the absorbent elastomer granules have a particle size of about 0.05 inches to about 0.5 inches; and wherein the ratio of absorbent elastomer to hydrocarbon liquid-fouled plastic is about 4:1 or more by weight; and agitating the mixture for a period of time.

14. The process of claim 13, wherein the thermal cracking occurs at a temperature of about 480° C. to about 590° C.

15. The process of claim 13, wherein the cleaned plastic waste and hydrocarbon liquid-absorbed elastomer granules feedstock can be combined with one or more additional feedstocks to form a combined feed for co-processing in a coking environment.

16. The process of claim 15, wherein the hydrocarbon liquid is present in an amount of about 1 wt % to about 20 wt %, based on the total weight of the hydrocarbon liquid-fouled plastic waste shreds and the absorbent elastomer granules.

17. The process of claim 15, wherein the combined feed is co-processed in a fluidized coking environment.

18. The method of claim 15, wherein the plastic waste comprises polyolefins.

19. The method of claim 18, wherein the polyolefins comprise high-density polyethylene, low-density polyethylene, linear low-density polyethylene, polystyrene, polypropylene, or combinations thereof.

* * * * *